(12) United States Patent
Harris et al.

(10) Patent No.: US 8,242,232 B2
(45) Date of Patent: Aug. 14, 2012

(54) COPOLYMERS WITH AMORPHOUS POLYAMIDE SEGMENTS

(75) Inventors: William J. Harris, Lake Jackson, TX (US); Jerry E. White, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 66 days.

(21) Appl. No.: 12/937,807

(22) PCT Filed: Apr. 29, 2009

(86) PCT No.: PCT/US2009/042011
§ 371 (c)(1),
(2), (4) Date: Oct. 14, 2010

(87) PCT Pub. No.: WO2009/134824
PCT Pub. Date: Nov. 5, 2009

(65) Prior Publication Data
US 2011/0034663 A1     Feb. 10, 2011

Related U.S. Application Data

(60) Provisional application No. 61/049,796, filed on May 2, 2008.

(51) Int. Cl.
*C08G 69/08* (2006.01)
*C08G 63/02* (2006.01)
(52) U.S. Cl. ........................................ 528/292
(58) Field of Classification Search .............. 528/292
See application file for complete search history.

(56) References Cited

U.S. PATENT DOCUMENTS

| | | | |
|---|---|---|---|
| 2,929,800 A * | 3/1960 | Hill, Jr. ............ | 525/403 |
| 3,507,834 A | 4/1970 | Wittbecker | |
| 3,905,925 A | 9/1975 | Vervloet | |
| 3,994,881 A | 11/1976 | Altau et al. | |
| 4,129,715 A | 12/1978 | Chen et al. | |
| 4,420,602 A | 12/1983 | Bonk et al. | |
| 4,420,603 A | 12/1983 | Nelb, II et al. | |
| 4,672,094 A | 6/1987 | Nelb, II et al. | |
| 4,772,649 A | 9/1988 | Andrews et al. | |
| 4,868,277 A | 9/1989 | Chen | |
| 5,093,382 A | 3/1992 | Speranza et al. | |
| 5,128,441 A | 7/1992 | Speranza et al. | |
| 5,310,827 A | 5/1994 | Komiya et al. | |
| 6,172,167 B1 | 1/2001 | Stapert et al. | |
| 2001/0043913 A1 | 11/2001 | Spaans et al. | |
| 2005/0272900 A1 | 12/2005 | Kuntimaddi et al. | |
| 2008/0214743 A1 | 9/2008 | Broos et al. | |
| 2010/0041292 A1 | 2/2010 | Kim et al. | |
| 2010/0041857 A1 | 2/2010 | Harris et al. | |
| 2010/0126341 A1 | 5/2010 | Matteucci et al. | |
| 2010/0126342 A1 | 5/2010 | Lopez et al. | |
| 2010/0127434 A1 | 5/2010 | Broos et al. | |
| 2010/0129591 A1 | 5/2010 | Lopez et al. | |
| 2010/0129634 A1 | 5/2010 | Lopez et al. | |
| 2010/0129641 A1 | 5/2010 | Lopez et al. | |
| 2010/0137478 A1 | 6/2010 | White et al. | |

FOREIGN PATENT DOCUMENTS

| | | |
|---|---|---|
| GB | 1137151 | 12/1968 |
| WO | 2008112833 | 9/2008 |

OTHER PUBLICATIONS

Corbin et al., "Chapter 6 Hydrogen-Bonded Supramolecular Polymers: Linear and Network Polymers and Self-Assembling Discotic Polymers", Supramolecular Polymers, 2nd edition, CRC Press, 2005, pp. 153-182.
Koevoets et al., "Molecular Recognition in a Thermoplastic Elastomer", Journal of the American Chemical Society, 2005, pp. 2999-3003, vol. 127.
Lips et al., "Synthesis and characterization of poly(ester amide)s containing crystallizable amide segments", Polymer, 2005, pp. 7823-7833, vol. 46, Elsevier Ltd.
Lips et al., "Incorporation of different crystallizable amide blocks in segmented poly(ester amide)s", Polymer, 2005, pp. 7834-7842, vol. 46, Elsevier Ltd.
Otsuki et al., "Synthesis of Multi-block Copolymers Based on Poly(oxyethylene)dicarboxylic acids and Polyamides by the Diisocyanate Method", Makromolekulare Chemie, Rapid Communications, 1987, pp. 637-640, vol. 8.
Otsuki et al, "Synthesis and Properties of Multiblock Copolymers Based on Polyoxyethylene and Polyamides by Diisocyanate Method", Journal of Applied Polymer Science, 1990, pp. 1433-1443, vol. 40, John Wiley & Sons, Inc.
Otsuki et al., "Synthesis and Properties of New Multiblock Copolymers Based on Poly(oxytetramethylene) and Polyamides by Diisocyanate Method", Polymer, 1990, pp. 2214-2219, vol. 31, Butterworth-Heinemann Ltd.
Wei et al., "A facile synthesis of polyamides from aromatic diisocyanates and dicarboxylic acid catalyzed by Lewis acids", Macromolecular Rapid Communications, 1996, pp. 897-903, vol. 17, Huthig & Wepf Verlag, Zug.

* cited by examiner

Primary Examiner — Terressa Boykin

(57) ABSTRACT

Disclosed herein are copolymers comprising a repeat unit of formula (I) and at least one of the following additional repeat units of formulae (II and III):

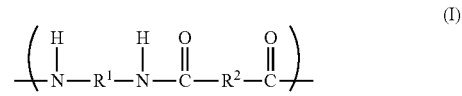

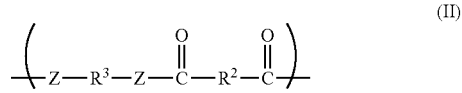

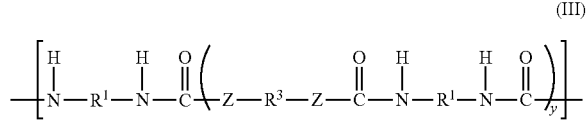

wherein at least from about 20% to about 90% of the copolymer is the repeat unit of formula (I), by weight based on the total weight of the copolymer and wherein the variables are as defined herein.

14 Claims, No Drawings

COPOLYMERS WITH AMORPHOUS POLYAMIDE SEGMENTS

CROSS-REFERENCE TO RELATED APPLICATIONS

This is a §371 application from PCT International Application No. PCT/US2009/042011, filed Apr. 29, 2009, which claims benefit from U.S. Provisional Application No. 61/049,796, filed May 2, 2008, the contents of both of which are incorporated herein by reference.

FIELD OF THE INVENTION

The present invention relates generally to copolymers comprising an amorphous polyamide segment. The present invention also relates to methods of producing and using the copolymers.

BACKGROUND

Polyamide-containing copolymers comprise a diverse group of copolymers. Typically, a polyamide-containing copolymer comprises repeat units that have at least two segments; a polyamide segment having a high thermal transition temperature, which is often referred to as a hard segment, and a polymeric segment having a low thermal transition temperature, which is chemically bonded to the hard segment and is often referred to as a soft segment. Typical examples of soft segments are certain polyesters, polyethers, polyolefins, polyols, polyetheresters, and mixtures thereof. Polyesteramides, polyetheramides and polyetheresteramides are examples of polyamide-containing copolymers.

Some members of polyamide-containing copolymers have utility in formation of fibers and films. Other members of polyamide-containing copolymers comprise thermoplastic elastomers and are melt processible to make molded articles, for example, seals, gaskets, and bushings. For a particular primary application, desirable physical properties of a polyamide-containing copolymer have been sought by making the copolymer to have certain hard segments and soft segments using monomers having specific structures. For example, U.S. Pat. No. 4,129,715 generally relates to certain polyetheramides and polyesteramides with crystalline polyamide hard-segments useful for producing articles by injection-molding processes at temperatures below about 285° C.

Polymer melt processing, such as injection or compression molding, film extrusion or blown-film extrusion, fiber spinning, sheet casting, tube extrusion, and the like, comprises heating a solid polymer feed to a flow temperature to create a highly processible polymer melt. For a particular polymer, a flow temperature is generally greater than the melting temperature ($T_m$) for a semi-crystalline polymer or the glass transition temperature (Tg) for an amorphous polymer. A flow temperature of a particular polymer is also limited to be below a temperature at which thermal degradation of the polymer begins. There is a need for a melt processible polyamide-containing copolymer that has thermal transitions ($T_m$ or Tg) below about 200° C. One of the benefits derived from melt processing a polyamide-containing copolymer at a lower temperature is minimizing or preventing degradation of the copolymer.

SUMMARY OF THE INVENTION

In a first aspect, the present invention provides a copolymer comprising a repeat unit of formula (I) and at least one of the following additional repeat units of formulae (II and III):

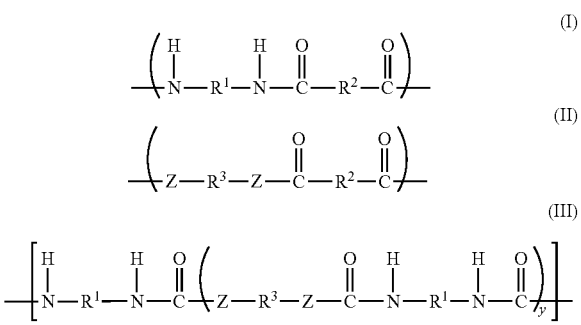

wherein:
at least from about 20% to about 90% of the copolymer is the repeat unit of formula (I), by weight based on the total weight of the copolymer;
y independently is an integer from 1 to about 200;
Z is oxygen or N(H);
$R^1$ is independently at each occurrence a $C_6$-$C_{24}$ divalent organic moiety, provided that for at least 55% of the occurrences of $R^1$, $R^1$ is independently at each occurrence a 1-methyl-2,4-phenylene or 1-methyl-2,6-phenylene;
$R^2$ is independently at each occurrence a bond or $C_1$-$C_{14}$ alkylene;
$R^3$ is independently at each occurrence a polyoxyalkylene, polyesteralkylene, or polyalkylene having a number average molecular weight ($M_n$) from about 400 to about 10,000; and
wherein the copolymer comprises at least one amorphous polyamide segment having from 2 to about 200 repeat units of formula (I).

In a second aspect, the present invention provides a process for producing the copolymer as defined in the first aspect of the invention, wherein Z is oxygen. The process comprises contacting a diol of formula HO—$R^3$—OH (IVa), a diacid of formula HOOC—$R^2$—COOH (Va) and one or more diisocyanates of formula O=C=N—$R^1$—N=C=O (VIIa) in one or more steps under reaction conditions sufficient to produce the copolymer comprising the repeat unit of formula (I) and at least one of the additional repeat units of formulae (II and III);
wherein:
$R^1$, $R^2$, and $R^3$ are as defined in the first aspect of the invention; and
the one or more diisocyanates include at least 55 mole % 2,4-toluenediisocyanate, 2,6-toluenediisocyanate, or mixtures thereof based on the total moles of the one or more diisocyanates.

In a third aspect, the present invention provides a process for producing the copolymer as defined in the first aspect of the invention, wherein Z is N(H). The process comprises contacting a diamine of formula $H_2N$—$R^3$—$NH_2$ (IVb) and one or more diamines of formula $H_2N$—$R^1$—$NH_2$ (VIIb) with a difunctional compound of formula A-C(O)—$R^2$—C(O)-A (V) in one or more steps under reaction conditions sufficient to produce the copolymer comprising the repeat units of formulae (I and II);
wherein:
$R^1$, $R^2$, and $R^3$ are as defined in the first aspect of the invention;
A is a halogen, —OH, or —$OR^6$, wherein $R^6$ is a $C_1$-$C_4$ alkyl; and the one or more diamines of formula (VIIb) include at least 55% 2,4-toluenediamine, 2,6-toluenediamine, or mixtures thereof based on the total moles of the one or more diamines.

In a fourth aspect, the present invention provides a process for producing the copolymer as defined in the first aspect of the invention, wherein Z is N(H). The process comprises the steps of:

(a) contacting a diamine of formula $H_2N$—$R^3$—$NH_2$ (IVb) with one or more diisocyanates of formula O=C=N—$R^1$—N=C=O (VIIa) under reaction conditions such that substantially all of the amino groups of formula (IVb) are reacted to obtain a mixture comprising an oligomeric diisocyanate of formula (VIIIb):

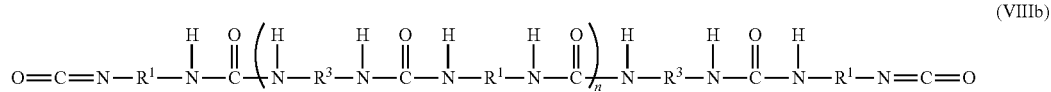

(VIIIb)

and any unreacted amount of formula (VIIa); wherein:
$R^1$ and $R^3$ are as defined in the first aspect of the invention;
n is zero or an integer from 1 to about 200;
the one or more diisocyanates include at least 55 mole % 2,4-toluenediisocyanate, 2,6-toluenediisocyanate, or mixtures thereof based on the total moles of the one or more diisocyanates;
and the molar ratio of formula (VIIa) to formula (IVb) is from about 1.5 to about 20; and (b) contacting the mixture obtained in step (a) with a diacid of formula HOOC—$R^2$—COOH (Va) under reaction conditions sufficient to produce the copolymer comprising the repeat units of formulae (I and III); wherein:
$R^2$ is as defined in the first aspect of the invention, and
the molar ratio of formula (Va) to the sum of formulae (VIIa and VIIIb) is from about 0.8 to about 1.2.

In a fifth aspect, the present invention provides a molded article manufactured by using the copolymer as defined in the first aspect of the invention.

DETAILED DESCRIPTION OF THE INVENTION

The present invention is summarized above and further described below. Hereinafter in the description, a polyamide-containing copolymer, polyesteramide, polyetheresteramide and the like optionally may be referred to for convenience simply as a copolymer, unless it is stated otherwise.

In describing the present invention, certain phrases, terms, and words are used that are defined here. When interpreting a meaning of an abbreviation, phrase, term, or word, its definition here governs unless, for a particular use, a different meaning is stated elsewhere in this specification or unless a context of the use of the abbreviation, phrase, term, or word clearly indicates a different meaning is intended from the definitions provided here.

The articles "a" and "the" refer to singular and plural forms of what is being modified by the articles. When used in front of a first member of a list of two or more members, the words "a" and "the" independently refer to each member in the list. As used herein, "a," "an," "the," "at least one," and "one or more" are used interchangeably. The term "comprises" and variations thereof do not have a limiting meaning where these terms appear in the description and claims. Thus, for example, a reactant mixture that comprises "a" diol can be interpreted to mean that the diol includes "one or more" diols. The term "or" refers to members in a list either singly or in any combination.

The word "diol" refers to an organic molecule bearing two hydroxyl (—OH) groups. The words "diacid", "diester", and "diacid chloride" refer to organic molecules bearing two carboxyl (—COOH) groups, two ester (e.g., —COOCH$_3$) groups, and two acid chloride (—C(O)Cl) groups, respectively. The word "diisocyanate" refers to an organic molecule bearing two isocyanate (—N=C=O) groups. Similarly, "diamine" refers to an organic molecule bearing two primary and/or secondary amine groups.

The term "alkylene" is defined as a divalent moiety derived from an aliphatic hydrocarbon by removal of two hydrogen atoms from one or two carbon atoms. The aliphatic hydrocarbon can be a straight chain, branched, or cyclical hydrocarbon. Non-limiting examples of alkylenes are —CH$_2$—, —CH$_2$CH$_2$—, —CH$_2$CH$_2$CH$_2$—, —CH(CH$_3$)CH$_2$—, —CH$_2$CH$_2$CH$_2$CH$_2$—, and cyclohexanediyl. The term "arylene" is defined as a divalent moiety derived from an aromatic hydrocarbon containing one or more phenyl rings by removal of hydrogen atoms from two carbon atoms on a same phenyl ring or two different phenyl rings. The one or more phenyl rings may bear substituents. Two or more phenyl rings in an aromatic hydrocarbon may be fused, or linked by one or more alkylenes or hetereoatoms. Non-limiting examples of arylenes are 1,2-phenylene, 1-methyl-2,4-phenylene 1-methyl-2,6-phenylene, 4,4'-methylenediphenyl, 2,4'-methylenediphenyl, and 2,2'-methylenediphenyl. A "hydrocarbylene" may be an alkylene or an arylene as defined. A hydrocarbylene is also used to describe the hydrocarbon residue derived from a difunctional organic molecule, such as a diol, diacid, diisocyanate, or diamine, by removal of the two functional groups.

A "substituted hydrocarbylene" means that one or more H or C atoms in the hydrocarbylene is substituted by one or more heteroatoms or one or more functional groups that contain one or more heteroatoms, which include, but are not limited to, nitrogen, oxygen, sulfur, phosphorus, boron, chlorine, bromine, and iodine.

A "divalent organic moiety" is defined as a hydrocarbylene or a substituted hydrocarbylene.

The term "polyoxyalkylene" is defined as any of a series of divalent moieties having a general formula —($R^5$O)$_z$—$R^5$—, wherein $R^5$ independently is at each occurrence a $C_2$-$C_6$ alkylene, z is an integer from one to about 500. Non-limiting examples of polyoxyalkylene are polyoxyethylene wherein $R^5$ is —CH$_2$CH$_2$—, polyoxytrimethylene wherein $R^5$ is —CH$_2$CH$_2$CH$_2$—, polyoxypropylene wherein $R^5$ is —CH(CH$_3$)CH$_2$—, and polyoxytetramethylene wherein $R^5$ is —CH$_2$CH$_2$CH$_2$CH$_2$—. Polyoxyalkylene may include mixtures of $R^5$O that may be random, blocky, or segmented. A polyoxyalkylene is also used to describe the residue derived from a polyoxyalkylene-diol of general formula HO—($R^5$O)$_z$—$R^5$—OH by removal of the hydroxyl (—OH) groups or a polyoxyalkylene-diamine of general formula $H_2N$—($R^5$O)$_z$—$R^5$—$NH_2$ by removal of the amino (—NH$_2$) groups.

Non-limiting examples of polyoxyalkylene-diols are polyethylene glycol, polypropylene glycol, poly(tetrahydrofuran) (also known as polytetramethylene glycol), and poly(ethylene glycol)-block-poly(propylene glycol)-block-poly(ethylene glycol), which, hereinafter, will be referred to as PEG-block-PPG-block-PEG.

The term "polyesteralkylene" is defined as any of a series of divalent moieties having a general formula —$R^5[OC(O)R^6C(O)OR^5]_k$— or —$R^7C(O)[OR^7C(O)]_kZR^8Z[C(O)R^7O]_kC(O)R^7$—, wherein $R^5$, $R^6$ and $R^7$ independently are at each occurrence a $C_2$-$C_{12}$ alkylene, $R^8$ is an alkylene, polyalkylene, or polyoxyalkylene, Z is oxygen or N(H), and k is an integer from one to about 250. Similarly, a polyesteralkylene is also used to describe the residue derived from a polyesteralkylene-diol by removal of the hydroxyl groups.

The phrase "an inert atmosphere" means a gas phase under which a reaction can be conducted substantially without interference from the comprising gases thereof. Examples of gases in the atmosphere, which may interfere with a reaction, are oxygen and moisture. Any technique known in the art for obtaining an inert atmosphere can be employed. For example, an inert atmosphere can be obtained by purging a reaction vessel with nitrogen or argon.

In a first aspect, the present invention provides a copolymer comprising a repeat unit of formula (I) and at least one of the following additional repeat units of formulae (II and III):

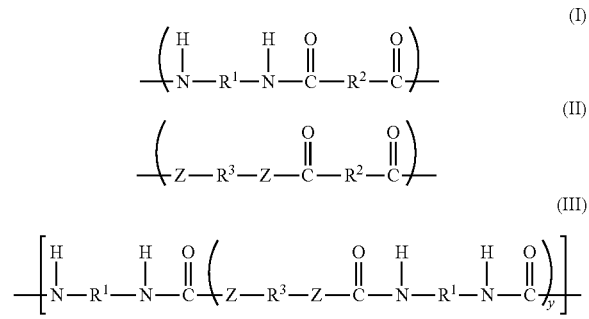

wherein $R^1$, $R^2$, $R^3$, Z, and y are as defined in the Summary of the invention.

The copolymer comprises advantageously greater than 20%, preferably greater than 30%, and advantageously less than 90%, preferably less than 80% of the repeat unit of formula (I) by weight based on the total weight of the copolymer.

The copolymers can be either random copolymers or blocky/segmented copolymers depending on the method of preparation, such as molar ratios of monomers employed, reaction temperature, and/or any catalyst employed. The preferred copolymer comprises at least one amorphous polyamide segment having advantageously two or more, preferably four or more, and more preferably ten or more repeat units of formula (I). The amorphous polyamide segment advantageously has less than about 200, preferably less than about 100, and more preferably less than about 50 repeat units of formula (I).

Preferably, $R^1$ independently is at each occurrence a $C_6$-$C_{24}$ hydrocarbylene, more preferably a $C_6$-$C_{24}$ arylene; wherein advantageously at least 55%, preferably at least 60%, more preferably at least 65%, still more preferably at least 70%, still more preferably at least 75%, still more preferably at least 80%, still more preferably at least 85%, still more preferably at least 90%, still more preferably at least 95% of the occurrences, $R^1$ independently is at each occurrence a 1-methyl-2,4-phenylene or 1-methyl-2,6-phenylene. More preferably, $R^1$ is independently at each occurrence a 1-methyl-2,4-phenylene or 1-methyl-2,6-phenylene.

Preferably, $R^2$ is independently at each occurrence a $C_3$-$C_{14}$ straight chain alkylene.

Preferably, $R^3$ independently is at each occurrence a polyoxyalkylene, polyesteralkylene, or polyalkylene having a number average molecular weight ($M_n$) of greater than about 600, more preferably greater than about 1000, and preferably less than about 7,000, and more preferably less than about 5,000. Non-limiting examples of polyoxyalkylene are those derived from polyoxyalkylene-diols by removal of hydroxyl (—OH) groups. Examples of polyoxyalkylene-diols are poly(tetrahydrofuran), polyethylene glycol, polypropylene glycol and PEG-block-PPG-block-PEG having number average molecular weights as defined above.

Members of PEG-block-PPG-block-PEG include, but are not limited to, those that are available from Aldrich (2007-2008 Catalog, page 2027) having the following $M_n$ and wt % PEG based on the total weight of PEG-block-PPG-block-PEG:

(a) a $M_n$ about 1100 and 10 wt % PEG,
(b) a $M_n$ about 1900 and 50 wt % PEG,
(c) a $M_n$ about 2000 and 10 wt % PEG,
(d) a $M_n$ about 2800 and 10 wt % PEG,
(e) a $M_n$ about 2800 and 15 wt % PEG,
(f) a Mn about 2900 and 40 wt % PEG, and
(g) a $M_n$ about 4400 and 30 wt % PEG.

Members of Poly(tetrahydrofuran) include, but are not limited to, those that are sold by Aldrich (2007-2008 Catalog, page 2066) under the trade names of TERATHANE® 1000 polyether glycol, TERATHANE® 1400 polyether glycol, TERATHANE® 2000 polyether glycol, and TERATHANE® 2900 polyether glycol. TERATHANE® is a registered trade name of E.I. du Pont de Nemours.

Non-limiting examples of polyalkylenes are those derived from polyalkylene-diols by removal of hydroxyl (—OH) groups. Members of polyalkylene-diols include hydroxyl terminated polybutadiene and hydroxyl terminated hydrogenated polybutadiene that are sold by Sartomer under the trade names of Poly bd® and Krasol®.

Non-limiting examples of polyesteralkylenes are those derived from polybutylene adipate polyols sold by Chemtura Corporation.

In a second aspect, the present invention provides a process for producing any one of the copolymers as defined in the first aspect of the invention, wherein Z is oxygen. The process comprises contacting a diol of formula HO—$R^3$—OH (IVa), a diacid of formula HOOC—$R^2$—COOH (Va) and one or more diisocyanates of formula O=C=N—$R^1$—N=C=O (VIIa) under reaction condition sufficient to produce the copolymer comprising the repeat unit of formula (I) and at least one of the additional repeat units of formulae (II and III); wherein formulae (I, II and III), $R^1$, $R^2$ and $R^3$ are as defined in the first aspect of the invention hereinabove.

The process can be carried out either stepwise or in a single step. The composition of the copolymer, i.e., the relative amounts of the three repeat units in the copolymer, is dependent on reaction conditions, relative ratios of the three monomers, any catalyst(s) that may be employed, and whether the process is stepwise or a single step.

Preferably, formula (IVa) is a polyoxyalkylene-diol, polyesteralkylene-diol, or polyalkylene-diol having a $M_n$ within the ranges stated hereinabove. Non-limiting examples of polyoxyalkylene-diols include polyethylene glycol, polypropylene glycol, poly(tetrahydrofuran), random copolymers of ethylene oxide and propylene oxide, PEG-block-PPG-block-PEG, and the like. More preferably, formula (IVa) having a $M_n$ in the range from about 1000 to about 5,000 is a member of poly(tetrahydrofuran) sold under the trade name of TERATHANE® as listed previously in the first aspect of the invention, or a member of PEG-block-PPG-block-PEG available from Aldrich as listed previously in the first aspect of the invention, or a mixture thereof.

Non-limiting examples of polyalkylene-diols include hydroxyl terminated polybutadiene and hydroxyl terminated hydrogenated polybutadiene that are sold by Sartomer under the trade names of Poly bd® and Krasol®.

Non-limiting examples of polyesteralkylene-diols are polybutylene adipate polyols sold by Chemtura Corporation.

Preferably, formula (Va) is selected from $C_3$-$C_{14}$ straight chain aliphatic diacids. Non-limiting examples of the diacids that can be employed in the process are adipic, pimelic, suberic, azelaic, sebacic, 1,11-undecandioic, 1,12-dodecandioic, α-methyladipic, α,α-dimethyladipic, α-ethylpimelic, α-ethyl-α-methylpimelic, 2,2,4-trimethyladipic, 2,4,4-trimethyladipic, α,α-dimethylazelaic, 1,2-cyclohexyldicarboxylic, 1,3-cyclohexyldicarboxylic, and 1,4-cyclohexyldicarboxylic acids.

The one or more diisocyanates include advantageously at least 55 mole %, preferably at least 60 mole %, more preferably at least 65 mole %, still more preferably at least 70 mole %, still more preferably at least 75 mole %, still more preferably at least 80 mole %, still more preferably at least 85 mole %, still more preferably at least 90 mole %, still more preferably at least 95 mole %, still more preferably 100 mole %, 2,4-toluenediisocyanate, 2,6-toluenediisocyanate, or mixtures thereof, based on the total moles of the one or more diisocyanates.

In a first preferred embodiment of the second aspect, the present invention provides a stepwise process for producing the copolymer comprising the repeat units of formula (I and II) as defined hereinabove.

In step (a), a diol of formula (IVa) is contacted with a diacid of formula (Va) under reaction conditions such that substantially all the hydroxyl groups in formula (IVa) are reacted to obtain a mixture comprising an oligomeric diacid of formula (VIa):

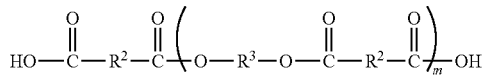
(VIa)

and any unreacted amount of formula (Va); wherein:

m is an integer of 1 or more, and advantageously m is less than about 200, preferably less than about 100, and more preferably less than about 50;

$R^2$ and $R^3$ are as defined in the first aspect of the invention hereinabove; and the molar ratio of formula (Va) to formula (IVa) advantageously is greater than about 1.5, preferably greater than about 2, more preferably greater than about 3, and advantageously is less than about 20, and preferably less than about 15.

The reaction between the diol of formula (IVa) and the diacid of formula (Va), which will be referred to as the first condensation reaction hereinbelow, can be carried out with or without an esterification catalyst. An esterification catalyst can be employed, if desired, or required in some instances in which the esterification reaction is slow. Any esterification catalyst can be used and p-toluenesulfonic acid, titanium(IV) butoxide, stannous octanoate, dibutyltin dilaurate, dibutyltin oxide, and sulfuric acid are non-limiting example of such catalysts. An amount of a catalyst, if employed, is determined based on the nature of the catalyst and a desired rate of the first condensation reaction. The amount advantageously is more than about 0.001%, preferably more than about 0.01%, and more preferably more than 0.1%, and advantageously is less than about 5%, preferably less than about 3%, and more preferably less than 1%, by weight based on the total weight of all the reactants of the first condensation reaction.

The first condensation reaction can be carried out with or without a solvent. Any solvent can be employed in the process, if desired, so long as the solvent does not substantially interfere with the process. The solvent, if employed, is advantageously capable of dissolving some of the starting materials, the intermediates, and the products. Preferably, the solvent is also useful in removing water azeotropically from the condensation reaction. Toluene, benzene, xylenes and mixtures thereof are non-limiting examples of solvents that can be employed by the process.

Advantageously, the condensation reaction is carried out in a stirred and heated reactor or a devolitizer, which will be simply referred to as the reactor hereinbelow. The reactor is advantageously fitted with a reflux column or distillation column and a means for removing water produced from the condensation reaction. Any means known in the art for removing water from a reaction may be adapted for the process. For example, water can be removed from the first condensation reaction by: a) running the reaction under reduced pressure if the reaction does not use any volatile reactants or solvents; b) refluxing azeotropically if the reaction uses one or more solvents that form an azeotrope with water; or c) sweeping an inert gas through the reactor. A similarly equipped reactor can be employed in each process of each aspect of the invention described hereinbelow, unless otherwise stated.

The first condensation reaction is carried out at a reaction temperature such that substantially all the hydroxyl groups in formula (IVa) are reacted advantageously in less than about 24 hours, preferably less than about 8 hours, and more preferably within 1 hour. The reaction time advantageously is more than about 5 minute, preferably more than about 10 minutes. The reaction temperature advantageously is greater than about 50° C., preferably greater than about 100° C., and more preferably greater than about 110° C., and advantageously is below about 300° C., preferably below about 250° C., and more preferably below about 200° C. Preferably, the condensation reaction is conducted under an inert atmosphere.

Completion of the first condensation reaction can be determined by the amount of water removed from the reaction, i.e. two moles of water are produced, theoretically, from each mole of the diol of formula (IVa). When the first condensation reaction is substantially complete, step (a) of the process produces a diacid mixture comprising an oligomeric diacid of formula (VIa) as shown hereinabove and the unreacted diacid of formula (Va). The number average molecular weight of formula (VIa) can be controlled by the molar ratio of formula (Va) to formula (IVa) employed. A higher number average molecular weight of formula (VIa) can be obtained by employing a lower molar ratio of formula (Va) to formula (IVa) within the ranges stated hereinabove, and vise versa. The diacid mixture can be used directly in step (b) of the process if either a solvent is not employed in step (a) or the solvent employed can be carried over to step (b). If a solvent is employed in step (a) and the solvent is not appropriate or undesired for step (b), the solvent is removed from the diacid mixture by distillation either under atmospheric pressure or a reduced pressure.

In step (b) of the first preferred embodiment of the process of the second aspect of the invention, one or more diisocyanates of formula $O\!=\!C\!=\!N\!-\!R^1\!-\!N\!=\!C\!=\!O$ (VIIa), wherein $R^1$ is as defined hereinabove, are contacted with the diacid mixture obtained in step (a). Depending on the molar ratio of formula (Va) to formula (IVa) employed in step (a) and properties of the copolymer to be obtained, additional amount of the same diacid of formula (Va) employed in step (a) or a different diacid of formula (Va) is optionally added into the diacid mixture, which is then contacted with the one or more diisocyanates of formula (VIIa). The molar ratio of formula (VIIa) to the sum of the diacids of formulae (Va and VIa) advantageously is greater than about 0.8, preferably greater than about 0.9, and advantageously is less than about 1.2, preferably less about 1.1.

The reaction between the one or more diisocyanates of formula (VIIa) and the diacids is referred to as the second condensation reaction hereinbelow. The second condensation reaction is advantageously carried out by employing a catalyst to accelerate the reaction. Any catalyst known in the art to accelerate a reaction between an isocyanate and a carboxylic acid can be employed. Non-limiting examples of catalysts that can be employed in the process are phospholene-1-oxides, phospholane-1-oxides, phosphetane-1-oxides, 1,3-dimethyl-2-phospholene-1-oxide, 1,3-dimethyl-3-phospholene-1-oxide, alkali metal alkoxides, N-alkalai metal lactamates, Lewis acids such as aluminum chloride or hydrogen chloride, and mixtures thereof. One of the preferred catalysts is 3-methyl-1-phenyl-2-phospholene-1-oxide. An amount of a catalyst, if employed, is determined based on the nature of the catalyst and a desired rate of the second condensation reaction. The amount advantageously is more than about 0.001%, preferably more than about 0.01%, and more preferably more than 0.1%, and advantageously is less than about 5%, preferably less than about 3%, and more preferably less than 1%, by weight based on the total weight of all the reactants of the second condensation reaction. The catalyst can be added at any stage in step (a) or at the beginning of step (b).

The second condensation reaction can be carried out with or without a solvent. Any solvent can be employed in the process, if desired, so long as the solvent does not substantially interfere with the process. Non-limiting examples of solvents that can be employed, if desired, are tetramethylenesulfone, dichlorobenzene, monochlorobenzene, α-butyrolactone, N-methylpyrrolidone, N,N-dimethylformamide, N,N-dimethylacetamide, xylene, and mixtures thereof.

The second condensation reaction can be carried out in the same or a different reactor as employed in step (a) for the first condensation reaction. The reaction is carried out at a reaction temperature such that substantially all the one or more diisocyanate of formula (VIIa) are reacted with the diacids of formulae (Va and VIa) advantageously in less than about 24 hours, preferably less than about 8 hours, and more preferably within 1 hour. The reaction time advantageously is more than about 5 minute, preferably more than 10 minutes. The reaction temperature advantageously is greater than about 50° C.,  preferably greater than about 100° C., and more preferably greater than about 110° C., and advantageously is below about 300° C., preferably below about 280° C., and more preferably below about 260° C. Preferably, the second condensation reaction is conducted under an inert atmosphere.

The progress of the second condensation reaction can be followed by measuring the amount of carbon dioxide evolved from the reaction. When the reaction is determined to be substantially complete, the copolymer product, when prepared in a solvent, can be recovered from the reaction mixture by pouring the reaction fluid into a non-solvent for the copolymer. Alternatively, the solvent can be devolatilized from the copolymer. Methanol, acetone, hexane, water, and mixtures thereof are non-limiting examples of such non-solvents. The copolymer generally precipitates and solidifies in a non-solvent or a mixture of a solvent and a non-solvent. The precipitated copolymer is collected, washed, if desired, with the same, or a different non-solvent from which the copolymer is precipitated, or a mixture thereof. The copolymer is then dried using conventional procedures to a constant weight and then processed to a form suitable for measuring one or more properties of the copolymer for one or more primary applications.

The process can be carried out either in batch or in continuous mode. When the copolymer is prepared in a melt, it can be prepared in batch stirred reactors or in a reactive extruder (REX). If the copolymer is prepared in the melt with no solvent, it can be extruded and pelletized or converted directly into shaped articles.

In a second preferred embodiment of the second aspect of the invention, the present invention provides a stepwise process for producing the copolymer comprising the repeat units of formulae (I and III), wherein Z is oxygen, as defined in the first aspect of the invention hereinabove.

In step (a) of the process, a diol of formula HO—$R^3$—OH (IVa) is contacted with one or more diisocyanates of formula (VIIa) under reaction conditions such that substantially all of the hydroxyl groups of formula (IVa) are reacted to obtain a mixture comprising an oligomeric diisocyanate of formula (VIIIa):

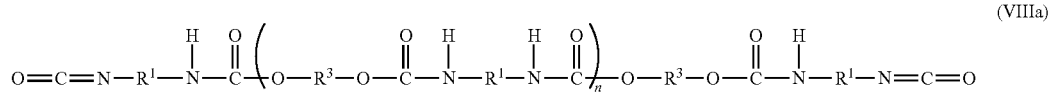

(VIIIa)

and any unreacted amount of formula (VIIa); wherein:
n is zero or an integer of 1 or more, and advantageously n is less than about 200, preferably less than about 100, and more preferably less than about 50;
$R^1$ and $R^3$ are as defined in the first aspect of the invention; and the molar ratio of formula (VIIa) to formula (IV) advantageously is greater than about 1.5, preferably greater than about 2, more preferably greater that about 3, and advantageously is less than about 20, preferably less that about 15.

It is known in the art that an isocyanate capped diisocyanate oligomer can be prepared by reacting a diol with excess amount of a diisocyanate. For example, U.S. Pat. Nos. 3,507,834, 3,905,925, and 3,994,881, which are incorporated herein by reference, relate to processes for preparation of polyurethane and/or polyurethane-urea employing diisocyanate oligomers as intermediates.

The reaction between the one or more diisocyanates of formula (VIIa) and the diol of formula HO—$R^3$—OH (IVa)

can be carried out with or without a solvent. Any solvent can be employed in the process, if desired, so long as the solvent does not substantially interfere with the process. The solvent, if employed, is advantageously capable of dissolving some of the starting materials, the intermediates, and the products. Toluene, benzene, xylenes and mixtures thereof are non-limiting examples of solvents that can be employed by the process.

The contacting is advantageously carried out at a reaction temperature sufficient to react substantially all of the hydroxyl groups of formula (IVa) with isocyanate groups of formula (VIIa) within about 24 hours, preferably within about 12 hours, more preferably within about 6 hours. The reaction time advantageously is more than about 10 minutes, preferably more than 30 minutes, and more preferably more than about 1 hour. The reaction temperature is preferably greater than about 25° C., more preferably greater than about 35° C., and advantageously below about 250° C., preferably below about 100° C.

The reaction is preferably carried out at a temperature above the melting point of the one or more diisocyanates when the process does not employ a solvent. However, for control of the process as well as for its economy, the temperature is more preferably less than 40° C., still more preferably less than 20° C., still more preferably less than 10° C., and still more preferably less than 5° C. above the melting point of the one or more diisocyanate.

Moreover, the reaction is, preferably, carried out under substantially anhydrous conditions, i.e., water is excluded from the reaction mixture to such an extent that the reaction occurs essentially only between the hydroxyl groups and the isocyanate groups. The water content of the reaction advantageously is less than about 0.5%, preferably less than about 0.1% by weight of the reaction mixture. When a larger amount of water, e.g., great than about 0.5% by weight, is present in the reaction mixture, "water-extended" oligomers may be formed. The reaction is conveniently carried out in an atmosphere of dry inert atmosphere, e.g., nitrogen or carbon dioxide, and, if desired, under reduced pressure.

A catalyst may be used in the reaction between the diisocyanate and the diol, if desired, to shorten the reaction time, but not essential in carrying out this reaction. Tertiary amines, such as triethylamine, 1,4-diarabicyclo(2.2.2)octane (DABCO), and 1,2-dimethylimidazole, and various organo-metallic compounds, such as dibutyltin dilaurate, are non-limiting examples of conventional catalysts that accelerate the reaction of isocyanate and hydroxyl groups. An amount of a catalyst, if employed, is determined based on the nature of the catalyst and a desired rate of the reaction. The amount is advantageously more than about 0.001%, preferably more than about 0.01%, and advantageously is less than about 5%, preferably less than 1%, by weight of all the reactants of the reaction.

In step (b) of the second preferred embodiment of the process of this second aspect of the invention, a diacid of formula HOOC—R²—COOH (Va) is contacted with the mixture obtained in step (a) comprising the oligomeric diisocyanate of formula (VIIIa) and the one or more diisocyanates of formula (VIIa) under reaction conditions sufficient to produce the copolymer comprising the repeat units of formulae (I and III) as defined hereinabove. Optionally, additional amount of the same one or more diisocyanates of formula (VIIa) or a different diisocyanate of formula (VIIa) can be added to the mixture prior to contacting the mixture with the diacid. The molar ratio of the diacid of formula (Va) to all the diisocyanates of formulae (VIIa and VIIIa) advantageously is greater than about 0.8, preferably greater than about 0.9, and advantageously is less than about 1.2, preferably less about 1.1. The contacting advantageously is carried out by following the procedures described for the second condensation reaction in the first embodiment of this aspect of the invention.

In a third preferred embodiment of the second aspect, the present invention provides a process for producing the copolymer comprising the repeat units of formulae (I, II, and III) as defined in the first aspect of the invention. The process comprises the steps of:

(a) preparing a first mixture comprising a diacid of formula HOOC—R²—COOH (Va) and an oligomeric diacid of formula (VIa):

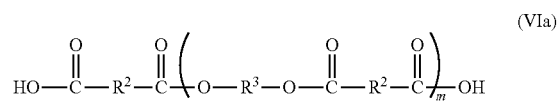

by contacting the diacid of formula (Va) with a diol of formula HO—R³—OH (IVa) according to the procedures described in step (a) of the first embodiment of this aspect of the invention; wherein:

m is an integer of 1 or greater, and advantageously m is less than about 200, preferably less than about 100, and more preferably less than about 50;

R² and R³ are as defined in the first aspect of the invention; and the molar ratio of the diacid of formula (Va) to the diol of formula (IVa) advantageously is greater than about 1.5, preferably greater than about 2, more preferably greater than about 3, and advantageously is less than about 20, preferably less about 15;

(b) preparing a second mixture comprising one or more diisocyanate of formula O=C=N—R¹—N=C=O (VIIa) and an oligomeric diisocyanate of formula (VIIIa):

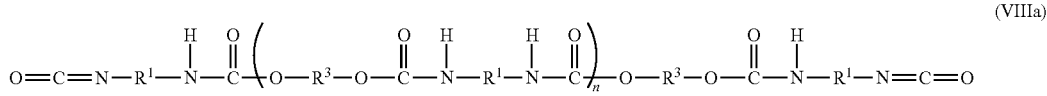

by contacting the one or more diisocyanate of formula (VIIa) with a diol of formula HO—R³—OH (IVa) according to the procedures described in step (a) of the second embodiment of this aspect of the invention; wherein:

n is zero or an integer of 1 or greater, and advantageously n is less than about 200, preferably less than about 100, and more preferably less than about 50;

R¹ and R³ are as defined in the first aspect of the invention; and the molar ratio of the diisocyanate of formula (VIIa) to the diol of formula (IVa) advantageously is greater than about 1.5, preferably greater than about 2, more preferably greater than about 3, and advantageously is less than about 20, preferably less about 15; and (c) contacting the first mixture, optionally additional amount of the diacid of formula (Va), with the second mixture, optionally additional amount of the one or more diisocyanate of formula (VIIa), according to the procedures described in step (b) of the first embodiment of this aspect of the invention to produce the copolymer comprising the repeat units of formulae (I, II, and III); wherein the molar ratio of all the diacids of formulae (Va and VIa) to all the diisocyanates of formulae (VIIa and VIIIa) advantageously is greater than about 0.8, preferably greater than about 0.9, and advantageously is less than about 1.2, preferably less about 1.1.

In a fourth preferred embodiment of the second aspect, the present invention provides a process for producing the copolymer comprising the repeat units of formulae (I, II and III) as defined in the first aspect of the invention. The process comprises contacting one or more diisocyanates of formula O=C=N—$R^1$—N=C=O (VIIa) with a mixture of a diol of formula HO—$R^3$—OH (IVa) and a diacid of formula HOOC—$R^2$—COOH (Va) under reaction conditions sufficient to produce the copolymer. The contacting advantageously is conducted in the presence of a catalyst mentioned in step (b) of the first embodiment of this second aspect of the invention. Preferably, the catalyst is 3-methyl-1-phenyl-2-phospholene-1-oxide.

The reaction conditions and the amount of the catalyst that can be employed in this embodiment are similar to those described in step (b) of the first embodiment of this second aspect of the invention. The conditions advantageously are sufficient for the following reactions to occur between the functional groups of the three monomers and reaction intermediates thereof:

(a) between the isocyanate groups and the carboxylic acid groups;
(b) between the hydroxyl groups and the carboxylic acid groups; and
(c) between the hydroxyl groups and the isocyanate groups.

The composition of the copolymer depends on the relative rates of the three reactions as well as molar ratios of the three monomers. The molar ratio of formulae (VIIa) to formula (IVa) advantageously is greater than about 1.5, preferably greater than 2, more preferably greater than about 3, and advantageously is less than about 20, preferably less than about 15. The molar ratio of formulae (VIIa) to formula (Va) advantageously is greater than about 1.5, preferably greater than 2, more preferably greater than 3, and advantageously is less than about 20, preferably less than about 15. The molar ratio of formula (VIIa) to the sum of formulae (IVa and Va) advantageously is greater than about 0.8, preferably greater than about 0.9, and advantageously is less than about 1.2, preferably less than about 1.1.

In a third aspect, the present invention provides a process for producing the copolymer comprising the repeat units of formulae (I and II) as defined in the first aspect of the invention, wherein Z is N(H). The process comprises contacting a diamine of formula $H_2N$—$R^3$—$NH_2$ (IVb) and one or more diamines of formula $H_2N$—$R^1$—$NH_2$ (VIIb) with a difunctional compound of formula A-C(O)—$R^2$—C(O)-A (V) in one or more steps under reaction conditions sufficient to produce the copolymer comprising the repeat units of formulae (I and II); wherein $R^1$, $R^2$, and $R^3$ are as defined in the first aspect of the invention; and A is a halogen, preferably chlorine, —OH, or —$OR^4$, wherein $R^4$ is a $C_1$-$C_4$ alkyl, preferably methyl.

Either random or blocky/segmented copolymers can be produced depending on the molar ratios of the three monomers, the order of contacting of the three monomers and specific reaction conditions.

The molar ratio of formula (V) to the sum of formulae (IVb) and (VIIb) is advantageously greater than about 0.8, preferably greater than about 0.9, and advantageously less than about 1.2, preferably less about 1.1.

The one or more diamines of formula (VIIb) include advantageously at least 55 mole %, preferably at least 60 mole %, more preferably at least 65 mole %, still more preferably at least 70 mole %, still more preferably at least 75 mole %, still more preferably at least 80 mole %, still more preferably at least 85 mole %, still more preferably at least 90 mole %, still more preferably at least 95 mole %, still more preferably 100 mole %, 2,4-toluenediamine, 2,6-toluenediamine, or mixtures thereof based on the total moles of the one or more diamines.

Preferably, formula (IVb) is a polyoxyalkylene-diamine, which is also called polydiamine for convenience. Polydiamines sold under the trade name of Jeffamine® diamines are non-limiting examples of formula (IVb) that can be employed in the present invention. Examples of Jeffamine® diamines are illustrated by formula (IVc) and (IVd):

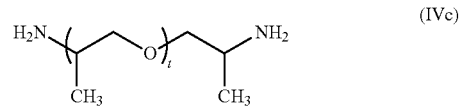

(IVc)

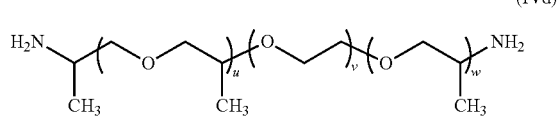

(IVd)

wherein:
t, u, v and w are average values;
t is in a range from about 6.0 to about 80;
v is in a range from about 9.0 to about 50;
(u+w) is a range from about 3.6 to about 6.0.

Another example of polyoxyalkylene-diamine that can be employed in the process is bis(3-aminopropyl) terminated polytetrahydrofuran, which is sold by Aldrich.

Preferably, formula (V) is selected from $C_3$-$C_{14}$ straight chain aliphatic diacids, diacid chlorides, and diesters. The diacid chlorides and diesters can be synthesized from the corresponding diacids as well known in the art. Non-limiting examples of the diacids are adipic, pimelic, suberic, azelaic, sebacic, 1,11-undecandioic, 1,12-dodecandioic, α-methyladipic, α,α-dimethyladipic, α-ethylpimelic, α-ethyl-α-methylpimelic, 2,2,4-trimethyladipic, 2,4,4-trimethyladipic, α,α-dimethylazelaic, 1,2-cyclohexyldicarboxylic, 1,3-cyclohexyldicarboxylic, and 1,4-cyclohexyldicarboxylic acids.

In a first preferred embodiment of the third aspect of the invention, the copolymer is prepared in a stepwise process. In step (a) of this process, a diamine of formula (IVb) is contacted with a difunctional compound of formula (V) under reaction conditions such that substantially all the amino groups of formula (IVb) are reacted to obtain a mixture comprising a difunctional oligomer of formula (VIb):

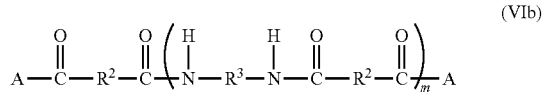

(VIb)

and any unreacted amount of formula (V); wherein:
m is an integer of 1 or greater, and advantageously m is less than about 200, preferably less than about 100, and more preferably less than about 50;
A, $R^2$ and $R^3$ are as defined hereinabove; and
the molar ratio of formula (V) to formula (IVb) advantageously is greater than about 1.5, preferably greater than 2, more preferably greater than about 3, and advantageously is less than about 20, preferably less than about 15.

The reaction between formulae (IVb) and (V) in this aspect of the invention process will be called a first amide formation reaction hereinbelow. Advantageously, the first amide formation reaction is carried out in a stirred and heated reactor or a devolitizer, which will be simply referred to as the reactor hereinbelow. The reactor is advantageously fitted with a reflux column or distillation column and means for removing HCl, $H_2O$, or $R^4OH$ produced from the condensation reaction.

The first amide formation reaction is advantageously run under an inert atmosphere with or without a solvent. Any solvent can be employed in the process, if desired, so long as the solvent does not substantially interfere with the process. The solvent, if employed, is advantageously capable of dissolving some of the starting materials, the intermediates, and the products. Toluene, benzene, xylenes and mixtures thereof are non-limiting examples of solvents that can be employed by the process. The first amide formation reaction between a diacid chloride of formula (V), wherein A is —Cl, and a polydiamine of formula (IVb) is advantageously carried out at a reaction temperature sufficient to react substantially all of the amino groups of formula (IVb) within 2 hours, preferably within about one hour, more preferably within 0.5 hour. The reaction time advantageously is more than about 1 minute, preferably more than 5 minutes. The reaction temperature is preferably greater than about 0° C., more preferably greater than about 35° C., and advantageously is below about 250° C., preferably below about 100° C. The HCl produced in the reaction can be removed by means known in the art for removing HCl from a reaction, for example, using an acid scavenger, such as a base, or sweeping an inert gas through the reactor.

The first amide formation reaction between a diester or a diacid of formula (V), wherein A is —OH or —$OR^4$ (wherein $R^4$ is a $C_1$-$C_4$ alkyl as defined previously), and a polydiamine of formula (IVb) is advantageously carried out at an elevated reaction temperature such that substantially all of the amino groups of formula (IVb) are reacted in less than 24 hours, preferably less than 12 hours, and more preferably less than 6 hours. The reaction time advantageously is more than about 10 minutes, preferably more than 30 minutes, and more preferably more than about 1 hour. The reaction temperature is preferably greater than about 65° C., more preferably greater than about 75° C., still more preferably greater than about 85° C., and is preferably below about 200° C., more preferably below about 190° C., and still more preferably below about 180° C. The reactor is advantageously equipped with a reflux column and means for removing the condensate (either $H_2O$ or $R^4OH$, wherein $R^4$ is a $C_1$-$C_4$ alkyl, preferably methyl) from the reaction. Any means known in the art for removing water or a low molecular weight alcohol from a reaction may be adapted for the process. For example: a) running the reaction under reduced pressure if the reaction does not use any volatile reactants or solvents; b) refluxing azeotropically if the reaction uses one or more solvents that form an azeotrope with water or the low molecular weight alcohol; or c) sweeping an inert gas through the reactor.

The progress of the first amide formation reaction can be monitored by measuring the amount of hydrogen chloride, water or $R^4OH$ produced in the reaction, when -A in formula (V) is —Cl, —OH or —$OR^4$, respectively. When the first amide formation reaction is determined to be substantially complete, the reaction fluid is evacuated to remove hydrogen chloride, water or $R^4OH$ to isolate a mixture comprising the difunctional oligomer of formula (VIb) and the unreacted amount of the difunctional compound of formula (V).

In step (b) of this first preferred embodiment of the third aspect of the invention, the mixture obtained in step (a) is contacted with one or more diamines of formula $H_2N$—$R^1$—$NH_2$ (VIIb). Optionally, additional amount of the same difunctional compound of formula (V), or different difunctional compound of formula (V), is added to the mixture obtained in step (a), which is then contacted with the one or more diamines of formula (VIIb). The contacting is carried out under reaction conditions such that substantially all of the one or more diamines of formula (VIIb) are reacted with formulae (V and VIb) to produce the copolymer comprising the repeat units of formulae (I and II), wherein Z is N(H). The molar ratio of formula (VIIb) to the sum of formulae (V and VIb) is advantageously greater than about 0.8, preferably greater than about 0.9, and advantageously is less than about 1.2, preferably less about 1.1.

The reaction between the one or more diamine of formula (VIIb) and the difunctional compounds of formulae (V and VIb) is referred to as the second amide formation reaction hereinbelow. The second amide formation reaction can be carried out in the same reactor in which the first amide formation reaction is carried out or in a different reactor. Substantially the same reaction conditions employed in the first amide formation reaction are advantageously employed for the second amide formation reaction to produce the copolymer comprising the repeat units of formulae (I and II), wherein Z is N(H).

When the second amide formation reaction is determined to be substantially complete, the copolymer product can be recovered from the reaction mixture by following substantially the same product isolation procedures as described in the second aspect of the invention.

In a second preferred embodiment of the third aspect, the copolymer is prepared in a process comprising two steps that are different in order from the two steps in the first embodiment. In step (a) of this embodiment, one or more diamines of formula (VIIb) are first contacted with a difunctional compound of formula (V) under reaction conditions sufficient to produce an oligomer comprising a repeat unit of formula (IX):

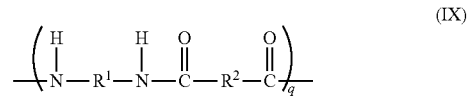

wherein:
q is an integer of 2 or greater, and advantageously q is less than about 200, preferably less than about 100, and more preferably less than about 50;
$R^1$ and $R^2$ are as defined hereinabove; and
the molar ratio of formula (V) to formula (VIIb) is advantageously greater than about 0.6, preferably greater than about 0.9, and advantageously less than about 1.5, preferably less than about 1.1.

In step (b), the oligomer comprising the repeat unit of formula (IX) obtained above is then contacted with a diamine of formula (IVb) and the difunctional compound of formula (V) under reaction conditions sufficient to produce the copolymer comprising the repeat units of formulae (I and II), wherein Z is N(H). The ratio of the total moles of formula (V) employed in both steps to the total moles of formulae (IVb and VIIb) is advantageously greater than about 0.8, preferably greater than about 0.9, and advantageously less than about 1.2, preferably less about 1.1.

The contacting conditions in both step (a) and (b) are substantially the same as described for the first amide formation reaction in the first preferred embodiment of this third aspect of the invention. The copolymer product can be recovered from the reaction mixture by following substantially the same product isolation procedures as described in the second aspect of the invention.

In a third preferred embodiment of the third aspect of the invention, a diamine of formula (IVb) and one or more diamines of formula (VIIb) are contacted substantially simultaneously with a difunctional compound of formula (V) under reaction conditions sufficient to produce the copolymer comprising the repeat units of formulae (I and II), wherein Z is N(H). The molar ratio of formula (V) to the sum of formulae (IVb and VIIb) is advantageously greater than about 0.8, preferably greater than about 0.9, and advantageously is less than about 1.2, preferably less about 1.1. The contacting conditions are substantially the same as described for the first amide formation reaction in the first embodiment of this aspect of the invention. The copolymer product can be recovered from the reaction mixture by following substantially the same product isolation procedures as described in the second aspect of the invention.

In a fourth aspect, the present invention provides a stepwise process for producing the copolymer comprising the repeat units of formulae (I and III) as defined in the first aspect of the invention, wherein Z is N(H).

In step (a) of the process in this fourth aspect of the invention, a diamine of formula $H_2N$—$R^3$—$NH_2$ (IVb) is contacted with one or more diisocyanates of formula $O$=$C$=$N$—$R^1$—$N$=$C$=$O$ (VIIa) under reaction conditions such that substantially all of the amino groups of formula (IVb) are reacted to obtain a mixture comprising an oligomeric diisocyanate of formula (VIIIb):

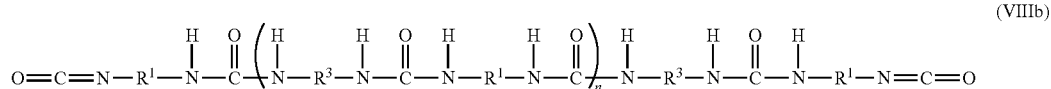

(VIIIb)

and any unreacted amount of formula (VIIa); wherein:
n is zero or an integer of 1 or greater, and advantageously n is less than about 200, preferably less than about 100, and more preferably less than about 50;
$R^1$ and $R^3$ are as defined in the first aspect of the invention; and the molar ratio of formula (VIIa) to formula (IVb) advantageously is greater than about 1.5, preferably greater that about 2, more preferably greater that about 3, and advantageously is less than about 20, preferably less that about 15.

The diamine of formula (IVb) and the one or more diisocyanates of formula (VIIa) are selected for the process according to descriptions in the second and third aspects of the invention.

This step (a) of the process of the fourth aspect of the invention can be carried out according to procedures and reaction conditions similar to those described in the second embodiment of the second aspect of the invention, i.e., the reaction between the diol of formula (IVa) and the one or more diisocyanate of formula (VIIa), except that a catalyst is not necessary in this embodiment because the one or more diisocyanates react readily with the diamine without a catalyst.

In step (b) of the process of this fourth aspect of the invention, the mixture obtained in step (a) is contacted with a diacid of formula HOOC—$R^2$—COOH (Va) under reaction conditions sufficient to produce the copolymer comprising the repeat units of formulae (I and III) as defined in the first aspect of the invention hereinabove. This reaction advantageously is carried out according to the procedures and the reaction conditions described for the second condensation reaction in the second aspect of the invention.

The copolymers described above have advantageous physical and mechanical properties. The selection of structure characteristics of hard and soft segments as defined above results in copolymers that can range from being thermoplastic elastomers to tough thermoplastics depending on the structures and relative amounts of the hard and soft segments. The structure of the polyamide-containing hard segments render the hard segments amorphous with glass transition temperatures below about 200° C., preferably below about 170° C. Comparing to high melting temperatures of semi-crystalline polyamide-containing copolymers, the copolymers comprising amorphous hard-segments can be processed at lower temperatures, which reduce or prevent degradation of the soft-segment of the copolymers. For example, a polyamide-containing copolymer, which comprises polyoxyalkylene soft-segments that are bonded to hard segments through ester groups, is susceptible to degradation at high temperatures, e.g., greater than about 200° C., which substantially limits the time and temperature at which the copolymer can be processed.

The copolymers of the present invention have mechanical properties, such as tensile strength, suitable for applications as molded articles. Additionally, the copolymers comprising amorphous polyamide hard-segments have the special advantage that the hard-segments and soft-segments can phase-separate for good mechanical properties, but yet are not dependent on the rate of crystallization or the perfection of crystalline domains as is the case for the semi-crystalline 4,4'-methylenediphenyl isocyanate-based polyamide-containing copolymers.

The copolymers provided by the present invention are not intended to be limited by molecular weight. However, the number average molecular weight of the copolymers is preferably greater than about 2000, more preferably greater than about 4000, and is preferably less than about 100,000, more preferably less than about 50,000. In preparation of the copolymers using the processes described hereinabove; the number average molecular weight of the copolymers can be controlled by using techniques known in the art. For example, the number average molecular weight can be controlled by employing off-stoichiometry of monomers utilized in the process, or by utilizing a terminating agent such as a mono-acid, mono-ester, mono-alcohol, mono-amine, mono-isocyanate and other single functional reactive species added at any point during the preparation. Excess diisocyanate may lead to initial molecular weight control, but can also lead to branching and eventual crosslinking depending on the amount as well as reactions conditions. It is also possible to prepare a branched copolymer by adding, at some point in any one of the processes described hereinabove, a trifunctional species including, but not limited to, triacids, trimesters, triols, triamines, and other reactive trifunctional species.

In a fifth aspect, the present invention provides an article produced using the copolymer having advantageous properties described above, such as lower glass transition temperature and high tensile strength. The copolymers comprising amorphous hard-segments are particularly advantaged in applications such as injection or compression molding to produce articles, such as seals, bushings, gaskets and other hard and soft rubber parts, decorative and protective powder coatings, hot-melt adhesives, toughening agents for polyesters and nylons, compatibilizing agents for thermoplastic blends, and the like.

In processing the copolymers for the above mentioned applications, one or more additives can be incorporated to improve the performance and/or extend the service life of the finished products. For example, one or more antioxidants can be incorporated before an injection or another melt process to stabilize the finished products. Any antioxidants known in the art of polymer processing can be use, particularly those commercially available, such as those sold under the trade names of Irganox™ 1010 and Irgafos™ 168. Other polymeric additives that can also be incorporated include, but are not limited to, ultraviolet light absorbers, antistatic agents, pigments, dyes, nucleating agents, fillers slip agents, fire retardants, plasticizers, processing aids, lubricants, stabilizers, smoke inhibitors, viscosity control agents and anti-blocking agents.

SPECIFIC EMBODIMENTS OF THE INVENTION

The following examples are set forth to illustrate the invention described herein, but the examples are not to be construed as limiting thereof. It is to be understood that all parts, percentages and proportions referred to in the examples are by weight unless otherwise indicated. Abbreviations "MPa", "g", "mL", "dL" and "mmol" are used for the words "megapascal", "gram", "milliliter" "deciliter" and "millimole", respectively, and plural forms thereof.

EXAMPLES

The following starting materials are used as received from suppliers: p-toluenesulfonic acid monohydrate (Aldrich), adipic acid (Aldrich), polyethylene oxide-block-polypropylene oxide-block-polyethylene oxide ($M_n$ 1100, Aldrich), o-xylene, anhydrous (Aldrich), tetramethylene sulfone (Aldrich), 3-methyl-1-phenyl-2-phospholene-1-oxide (TCI America), 2,4-tolylene diisocyanate (TCI America), polytetrahydrofuran (Aldrich, TERATHANE™ 1000 and 2000), VORANOL™ EP530 and VORANOL™ EP4240 (Dow Chemical) and polybutylene adipate polyol (A700, Chemtura).

Dilute solution viscosities are reported as inherent viscosity (IV). Aliquot of isolated and dried product is dissolved in either warm m-cresol or N,N-dimethylformamide at 0.5 g/dL. Solvent and solution flow times are measured in Ubbelhobde viscometer tubes using a Schott-Gerate CT1650/AVS 310 viscometry apparatus using a bath temperature of 30.0° C.

For FTIR spectra, small thin films are pressed on a ~225° C. Carver press with spectra collected on a Nicolet AVATAR 370 DTGS.

For differential scanning calorimetry (DSC), a TA Instruments DSC Q100 is utilized at a heating rate of 10° C./min that is cycled from −90° C. to about 225° C. to about −90° C. to about 225° C. All transitions are reported for the second heating segment. Glass transitions of either soft-segment or hard-segment are taken as the half-height of the transition. Trace amounts of absorbed moisture or residual solvent can depress the glass transition. Melting transitions for polybutylene adipate soft-segments or polytetrahydrofuran soft-segments are taken as maxima of melting endotherm which for these soft-segments are known to occur below ~70° C. Absence of endothermic peak (e.g., melting point) in the DSC above about 70° C. indicates that polyamide hard segment is amorphous.

Proton NMRs are performed on a Bruker Spectrometer as ~5% solutions of $d_6$-dimethylsulfoxide.

Tensile testing is performed on an INSTRON using ASTM D638 Microtensile at 20 mm/min rate with pneumatic grips, serrated faces, with 200 lbs load cell.

Example 1

Into a 3-neck, 500 mL round bottom flask is loaded p-toluenesulfonic acid monohydrate (0.032 g, 0.17 mmol), adipic acid (13.12 g, 89.80 mmol), and PEG-block-PPG-block-PEG (15.91 g, 14.46 mmol, $M_n$ 1100) and anhydrous o-xylene (200 mL) with inlet and outlet gas adaptors inserted into the flask along with stir-shaft & blade, stir-bearing, Dean-Stark trap, and a condenser. The assembled apparatus is placed under nitrogen purge with the apparatus completed with stir motor, salt bath, heat-tracing & insulation on Dean-Stark trap. The flask is immersed in a 157° C. bath with the first 30 mL of distillate drained off from the apparatus, and then kept under reflux overnight. The remaining bulk of xylene is distilled off with a bath temperature at ~165° C. The apparatus is removed from the bath. When the content in the flask is cooled to near ambient temperature, tetramethylene sulfone (200 mL) and 3-methyl-1-phenyl-2-phospholene-1-oxide (0.032 g, 0.17 mmol) are added to the flask along with 90 mL of anhydrous o-xylene. The flask is immersed into a 185° C. bath and the bulk of xylene is distilled off. The flask is removed from the bath, cooled, Dean-Stark trap & condenser removed, placed under static nitrogen, and a pressure equalizing funnel is attached which is loaded with 2,4-tolylene diisocyanate (10.97 mL, 76.84 mmol) and anhydrous o-xylene (10 mL). The flask is immersed into a 200° C. bath with diisocyanate solution added dropwise over ~25 minutes with funnel subsequently rinsed down into the flask with 10 mL of anhydrous o-xylene. The reaction proceeds for ~2.0 hours and then the hot solution is poured into stirred deionized water (~1.5 Liter (L)) with product repeatedly washed and soaked in fresh deionized water with optional soak and wash in water/methanol mixture. The product is dried to a constant weight in a vacuum oven at ~100° C. with a yield of 31.9 g. Glass transition of hard segment via DMA, tan δ is 134° C.

Inherent viscosity=1.49 dL/g (0.5 g/dL, m-cresol, 30.0° C.).

Percent Strain at break=513%.

Tensile modulus, tan 0.15%=115 MPa.

Tensile stress at maximum load=24.8 MPa.

Example 2-9

The procedure in Example 1 is repeated, with the exception that the polyol used in Example 1 is replaced in each example with a poly(tetrahydrofuran), which is named "Polyol T", or a PEG-block-PPG-block-PEG, which is named "Polyol P", as shown in Table 1 below. The amounts of each reagent in each example and the properties measured from each polyamide copolymer obtained are summarized in Table 1. Comparable amounts of o-xylene and tetramethylene sulfone used in Example 1 are used in Examples 2-9.

TABLE 1

Examples of Copolymers Based on TDI, Adipic Acid, and Polyetherpolyols

| Ex No. | Polyol $M_n$ | Polyol g (mmol) | AA g (mmol) | pTSA g (mmol) | PO g (mmol) | TDI g (mmol) | IV dL/g | % $E_b$ | TM MPa | TS, MPa | Tg Hard Seg °C. | Amorhous Hard Segment Yes/No |
|---|---|---|---|---|---|---|---|---|---|---|---|---|
| 2 | T 983 | 16.32 (16.60) | 12.70 (86.90) | 0.032 (0.17) | 0.032 (0.17) | 12.12 (69.59) | 1.04 0.58$ | 179 | 327 | 15.2 | 85* 89# | Yes |
| 3 | T 2054 | 16.32 (7.945) | 12.17 (83.28) | 0.032 (0.17) | 0.032 (0.17) | 13.11 (75.25) | 0.97 0.44$ | 303 | 707 | 41.8 | 117* 124# | Yes |
| 4 | P 1100 | 15.91 (14.46) | 13.12 (89.88) | 0.032 (0.17) | 0.032 (0.17) | 13.29 (76.31) | 0.74 | 264 | 103 | 7.8 | 85* | Yes |
| 5 | P 1965 | 16.32 (8.305) | 12.22 (83.65) | 0.032 (0.17) | 0.032 (0.17) | 13.12 (75.31) | 0.48 | 92 | 31.6 | 5.2 | 111* | Yes |
| 6 | P 1965 | 16.32 (8.305) | 12.22 (83.65) | 0.032 (0.17) | 0.032 (0.17) | 13.24 (76.04) | 0.57 | 123 | 28.4 | 6.3 | 111* | Yes |
| 7 | P 1965 | 16.32 (8.305) | 12.22 (83.65) | 0.032 (0.17) | 0.032 (0.17) | 13.39 (76.88) | 0.75 | 175 | 101 | 8.0 | 103* | Yes |
| 8 | P 3951 | 17.03 (4.309) | 11.36 (77.75) | 0.032 (0.17) | 0.032 (0.17) | 12.86 (73.84) | 0.52 | 104 | 40.2 | 6.1 | 102* | Yes |
| 9 | P 3951 | 17.03 (4.309) | 11.36 (77.75) | 0.032 (0.17) | 0.032 (0.17) | 13.00 (74.64) | 0.96 | 177 | 71.4 | 9.2 | 95* | Yes |

T = poly(tetrahydrofuran)
P = PEG-block-PPG-block-PEG
AA = adipic acid
pTSA = p-toluenesulfonic acid monohydrate
PO = 3-methyl-1-phenyl-2-phospholene-1-oxide
TDI = 2,4-tolylene diisocyanate
IV = inherent viscosity at 30.0° C., 0.5 g/dL, in m-cresol
IV$ = inherent viscosity at 30.0° C., 0.5 g/dL, in N,N-dimethylformamide
% Eb = % strain at break
TM = tensile modulus, tan 0.15%
TS = tensile strength at maximum load
*Tg via DSC
Tg via DMA Example 10

In a 3-neck, 500 mL round bottom flask is loaded tetramethylene sulfone (200 mL), 3-methyl-1-phenyl-2-phospholene-1-oxide (0.032 g, 0.17 mmol), and anhydrous o-xylene (90 mL) with inlet and outlet gas adaptors inserted into the flask along with a stir-shaft & blade assembly, stir-bearing, a Dean-Stark trap, and a condenser. The apparatus is placed under nitrogen purge with the apparatus completed with a stir motor, a salt bath, and heat-tracing & insulation on Dean-Stark trap. The flask is immersed in a 185° C. bath with bulk of xylene distilled off. The flask is removed from the bath, cooled, Dean-Stark trap & condenser removed, and placed under static nitrogen. Dry adipic acid (10.73 g, 73.44 mmol) and dry polybutylene adipate polyol ($M_n$ 713, 14.02 g, 19.66 mmol) are added to the flask. A pressure equalizing funnel which is loaded with 2,4-tolylene diisocyanate (16.46 g, 94.50 mmol) and anhydrous o-xylene (10 mL). The flask is immersed into a 200° C. bath with diisocyanate solution added dropwise over ~25 minutes with funnel subsequently rinsed down into flask with 10 mL of anhydrous o-xylene. The reaction proceeds for ~2.0 hours and then the warm solution is poured into stirred deionized water (~1.5 L) with product repeatedly washed and soaked in fresh deionized water with optional soak and wash in water/acetone mixture. The product is dried to a constant weight in a vacuum oven at ~100° C. with a yield of 30.4 g.
Inherent viscosity=0.76 dL/g (0.5 g/dL, m-cresol, 30.0° C.).
Percent Strain at break=181%.
Tensile modulus, tan 0.15%=509 MPa.
Tensile stress at maximum load=27.2 MPa.

What is claimed is:
1. A copolymer comprising a repeat unit of formula (I) and at least one repeat unit of formula II:

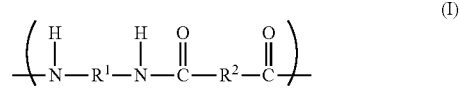

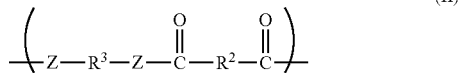

wherein:
at least from about 20% to about 90% of the copolymer is the repeat unit of formula (I), by weight based on the total weight of the copolymer;
Z is oxygen;
$R^1$ is independently at each occurrence a $C_6$-$C_{24}$ divalent organic moiety, provided that in at least 55% of the occurrences of $R^1$, $R^1$ is independently at each occurrence a 1-methyl-2,4-phenylene or 1-methyl-2,6-phenylene;
$R^2$ is independently at each occurrence a bond or $C_1$-$C_{14}$ alkylene;
$R^3$ is independently at each occurrence a polyoxyalkylene having a number average molecular weight ($M_n$) from about 400 to about 10,000; and
wherein the copolymer comprises at least one amorphous polyamide segment having from 2 to about 200 repeat units of formula (I).

2. The copolymer of claim 1, wherein the amorphous polyamide segment of the copolymer is further characterized by having a glass transition temperature of below 200° C.

3. The copolymer of claim 1, wherein $R^1$ independently is at each occurrence a $C_6$-$C_{24}$ arylene, wherein at least 55% of the $C_6$-$C_{24}$ arylenes are 1-methyl-2,4-phenylenes, 1-methyl-2,6-phenylenes, or mixtures thereof.

4. The copolymer of claim 1, wherein $R^2$ is independently at each occurrence a $C_3$-$C_{14}$ straight chain alkylene.

5. The copolymer of claim 1, wherein $R^3$ independently is at each occurrence a polyoxyalkylene having a $M_n$ from about 1000 to about 5,000.

6. The copolymer of claim 5, wherein $R^3$ is a polyoxyalkylene which is the residue derived from a polyoxyalkylene-diol.

7. The copolymer of claim 6, wherein the polyoxyalkylene-diol is selected from the group consisting of polyethylene glycol, polypropylene glycol, poly(tetrahydrofuran) having a number average molecular weight ($M_n$) from about 1000 to about 2900, and PEG-block-PPG-block-PEG having a $M_n$ from about 1000 to about 5000 and having from about 10% to 50% of PEG by weight based on the total weight of the PEG-block-PPG-block-PEG.

8. A process for producing the copolymer as in claim 1, the process comprising, contacting a diol of formula HO—$R^3$—OH (IVa), a diacid of formula HOOC—$R^2$—COOH (Va) and one or more diisocyanates of formula O=C=N—$R^1$—N=C=O (VIIa) in one or more steps under reaction conditions sufficient to produce the copolymer comprising the repeat unit of formula (I) and at least one of the additional repeat units of formula II; wherein the one or more diisocyanates include at least 55 mole % 2,4-toluenediisocyanate, 2,6-toluenediisocyanate, or mixtures thereof based on the total moles of the one or more diisocyanates.

9. The process of claim 8, comprising the steps of:
(a) contacting the diol of formula (IVa) with the diacid of formula (Va) under reaction conditions such that substantially all the hydroxyl groups in formula (IVa) are reacted to obtain a mixture comprising an oligomeric diacid of formula (VIa):

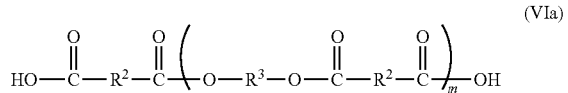
(VIa)

and any unreacted amount of formula (Va);
wherein m is an integer from 1 to about 200 and the molar ratio of formula (Va) to formula (IVa) is from about 1.5 to about 20; and (b) contacting the one or more diisocyanates of formula (VIIa) with the mixture obtained in step (a) under reaction conditions such that substantially all of the one or more diisocyanates are reacted with the oligomeric diacid of formula (VIa) and diacid of formula (Va) to produce the copolymer comprising the repeat units of formulae (I and II);
wherein the molar ratio of formula (VIIa) to the sum of formulae (Va and VIa) is from about 0.8 to about 1.2.

10. The process of claim 9, wherein step (b) of the process further comprises adding an additional amount of the same diacid of formula (Va) or a different diacid of formula (Va) into the mixture obtained in step (a) prior to contacting the mixture with the one or more diisocyanates of formula (VIIa).

11. The process of any one of claim 10, wherein the diacid of formula (Va) is selected from the group consisting of $C_3$-$C_{14}$ straight chain aliphatic diacids.

12. The process of any one of claim 10, wherein the diol of formula (IVa) is a polyoxyalkylene-diol, polybutylene adipate polyol, hydroxyl terminated polybutadiene, or hydroxyl terminated hydrogenated polybutadiene.

13. The process of claim 12, wherein the polyoxyalkylene-diol is a polyethylene glycol, polypropylene glycol, poly(tetrahydrofuran) having a number average molecular weight ($M_n$) from about 1000 to about 2900, or a PEG-block-PPG-block-PEG having a $M_n$ from about 1000 to about 5000 and having from about 10% to 50% of PEG by weight based on the total weight of the PEG-block-PPG-block-PEG.

14. A molded article manufactured by using the copolymer as in claim 1.

\* \* \* \* \*